(12) United States Patent
Smith

(10) Patent No.: US 7,430,987 B2
(45) Date of Patent: Oct. 7, 2008

(54) AUTOMATIC EGG VACCINATOR

(76) Inventor: David Fredrick Smith, Alameda Itanhaem, 373 Residential III, Santana de Parnaiba, SP 06542-140 (BR)

( * ) Notice: Subject to any disclaimer, the term of this patent is extended or adjusted under 35 U.S.C. 154(b) by 242 days.

(21) Appl. No.: 11/152,613

(22) Filed: Jun. 14, 2005

(65) Prior Publication Data
US 2005/0284376 A1 Dec. 29, 2005

(30) Foreign Application Priority Data
Jun. 15, 2004 (BR) ............................... 8401284 U

(51) Int. Cl.
*A01K 45/00* (2006.01)
(52) U.S. Cl. ........................................ 119/6.8
(58) Field of Classification Search ................. 119/6.8; 606/108; 604/506, 93.01, 115, 116
See application file for complete search history.

(56) References Cited

U.S. PATENT DOCUMENTS

| | | | |
|---|---|---|---|
| 4,903,635 A * | 2/1990 | Hebrank ...................... 119/6.8 |
| 5,158,038 A * | 10/1992 | Sheeks et al. ................. 119/6.8 |
| 5,176,101 A * | 1/1993 | Paul et al. ..................... 119/6.8 |
| 5,699,751 A * | 12/1997 | Phelps et al. .................. 119/6.8 |
| 5,784,992 A * | 7/1998 | Petitte et al. .................. 119/6.8 |
| 6,032,612 A * | 3/2000 | Williams ...................... 119/6.8 |
| 6,145,668 A * | 11/2000 | DePauw et al. ............. 209/510 |
| 6,176,199 B1 * | 1/2001 | Gore et al. .................... 119/6.8 |
| 6,240,877 B1 | 6/2001 | Bounds |
| 6,286,455 B1 * | 9/2001 | Williams ...................... 119/6.8 |
| 6,395,961 B1 * | 5/2002 | Petitte et al. ................... 800/21 |
| 6,510,811 B1 * | 1/2003 | Gore et al. .................... 119/6.8 |
| 6,601,533 B1 | 8/2003 | Bounds, Jr. |
| 6,668,753 B2 * | 12/2003 | Hebrank ...................... 119/6.8 |
| 6,981,470 B2 * | 1/2006 | Gross et al. ................... 119/322 |
| 7,041,439 B2 * | 5/2006 | Phelps et al. ..................... 435/4 |
| 7,096,820 B2 * | 8/2006 | Correa et al. .................. 119/6.8 |
| 7,165,507 B2 * | 1/2007 | Wolfe et al. ................... 119/6.8 |
| 7,185,603 B2 * | 3/2007 | Correa et al. .................. 119/6.8 |
| 7,261,053 B2 * | 8/2007 | Karaca et al. ................. 119/6.8 |

\* cited by examiner

*Primary Examiner*—Yvonne R. Abbott
(74) *Attorney, Agent, or Firm*—J. Charles Dougherty

(57) ABSTRACT

The invention relates to a system of automatic vaccination of eggs, developed for the purpose of vaccinating large quantities of fertile eggs in order to reduce the costs and labor involved, reduce embryonic mortality by increasing protection from diseases and reduce the stress in the first day of life of poultry chicks by eliminating the process of manually vaccinating each chick. The invention comprises an automatic system controlled by a PLC (programmable logic controller), using an injector that has a cylindrical body and cap made from high density non-corrosive plastic and together they form a pneumatic chamber, the cap containing an electronic contact sensor to signal empty egg spaces and avoiding wasting vaccine. The injector's pneumatic chamber contains a plasticized fiber sleeve to permit smooth movement of the pneumatic plunger. A needle passes through the plunger and a double acting spring in addition to securing the plunger in its starting position and returning it to the original position after the injection of vaccine, reduces the pressure on the needle after it breaks the egg shell to avoid harming the embryo. The injection platform that has conical holes for the injectors to permit lateral movements that allows the injectors to accommodate eggs that are tilted, with the injectors locked into position by a series of air bladders located within the platform and running parallel to the injectors. The sanitization system which disinfects the needle and the part of the injector in contact with the egg after every single injection is coupled with the removal of the incubator trays from the vaccination area to economize on production time.

11 Claims, 4 Drawing Sheets

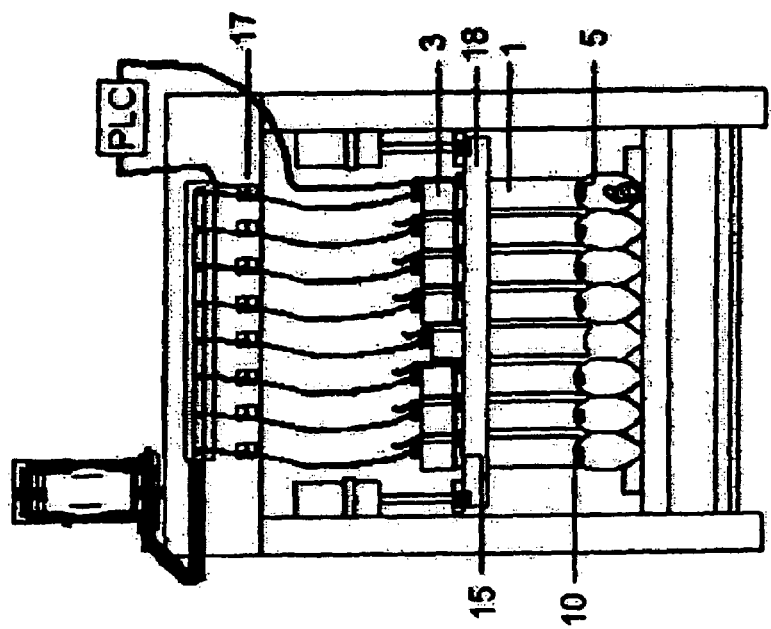
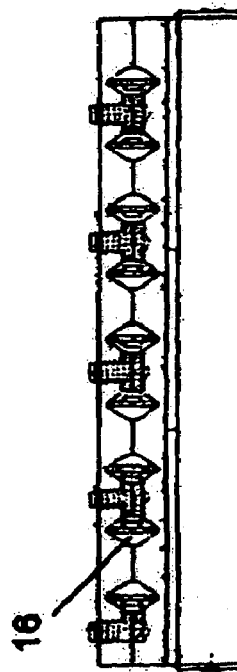
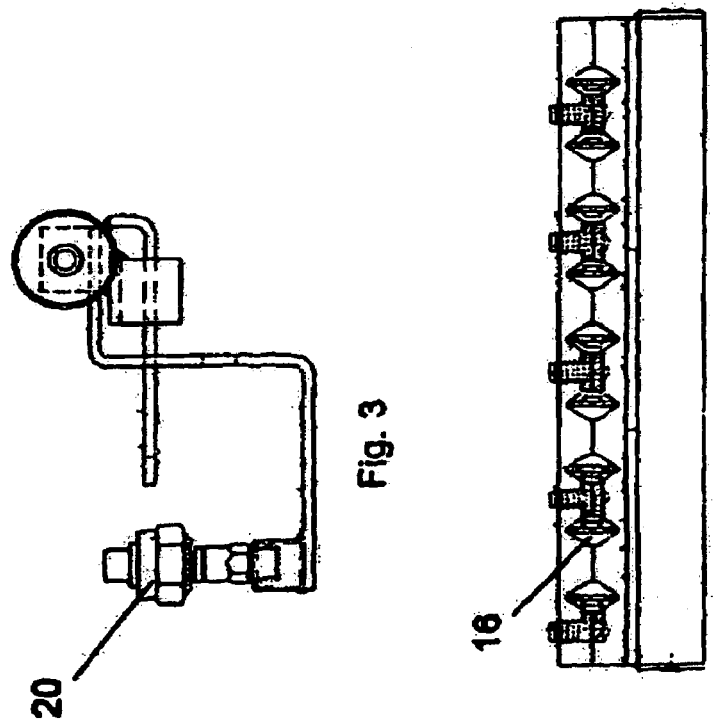
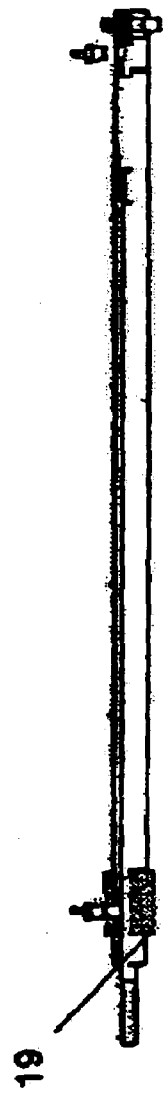

AUTOMATIC EGG VACCINATOR

RELATED APPLICATION

This application claims priority from Brazilian Application No. MU8401284-6, filed on Jun. 15, 2004, in Brazil.

FIELD OF THE INVENTION

This invention relates to a system of automatic vaccination of eggs.

BACKGROUND OF THE INVENTION

The process of vaccinating eggs is important in the medical field and in poultry production. In medicine, eggs are used to incubate biological material utilized in the production of vaccines. In poultry production, the objective of in-egg vaccination is to protect the animals from endemic diseases.

Embryos receiving vaccine three days before hatching instead of the first day after hatching have more time to develop antibodies and consequently have a greater resistance to diseases. In this process, the vaccine ideally is applied directly into the allantoidal cavity of the egg, without direct needle contact with the embryo.

The incubation time for a chicken embryo is typically 21 days and in-egg vaccination is normally performed three days prior to hatching during the routine process of transferring the eggs from the incubator machine to the hatcher machine. The eggs that have previously been secured in incubator trays in which the eggs are fixed in a vertical position are now transferred in sets of one to four flats into hatcher baskets where they are allowed to lay down in unencumbered positions so that they can hatch without injury.

The structure of the egg is composed of a shell, a membrane adhering to the inside of the shell, and an interior membrane holding the embryo within the allantoidal fluid.

When the egg is laid, the two membranes are in contact with one another, but they gradually separate during the incubation process, creating an air cell between the membranes. This air cell is located in the top of the egg as per its position in the incubator tray.

The process of vaccinating in-egg must be done with care to avoid cracking the egg shell or penetrating the embryo, either of which can be fatal to the embryo The vaccinator described in previous U.S. Pat. No. 6,240,877, issued to Bounds, has a rolling bridge which supports the vaccinating platform and transports it through the vaccination positions and then moves it to the sanitization chamber where the needles and injectors are sprayed with a disinfecting spray. The vaccinating platform has sufficient needles for vaccinating only one tray, usually meaning one third or one fourth of the total eggs that will be transferred, so 3 or 4 cycles of injections are needed to vaccinate all of the eggs for a conventional hatcher tray.

This means that each needle is used to vaccinate three or four eggs before being sanitized. The vaccination of more than one egg without sanitization creates the potential for spreading contamination from one egg to the next during the cycle. The repetitiveness of the vaccination cycle results in a slow process and low productivity.

The in-egg vaccinator referred to in the Bounds patent has an injector platform made of three plates, two metal plates and one fiberglass plate that support and guide the vaccine injectors. The plates have identical holes that are slightly larger than the diameter of the injectors and only permit the injectors to move vertically. There is no lateral movement to accommodate eggs that are seated in the incubator tray at an angle to the vertical position.

Once the set of incubator trays has been positioned below the injector platform, the platform is lowered over the eggs and the injectors are positioned so that they sit on top of the eggs. The platform continues to be lowered until it reaches the end of its stroke or course. The middle plate of the platform is pushed slightly to one side by an air cylinder to lock the injectors in their vertical positions. If the eggs are slightly tilted, the needle then enters the shell at an angle that may cause the shell to crack and may make contact with the embryo, both of which can be fatal to the embryo.

The injector used for vaccination has a metal pneumatic air cylinder encased in a plastic sleeve. The air cylinder has a hollow plunger through which the needle passes. A return spring inside the air cylinder causes the needle to return to its initial position after it has injected the egg.

One of the major drawbacks of the injector referred to above is that the metal air cylinder suffers severe oxidation resulting from the strong corrosive action of the disinfectants used to sanitize the vaccinator. The build up of oxidized material on the plunger inhibits its movement and eventually freezes it in place. The repair and substitution of the air cylinder causes production delays in addition to higher costs.

The referred to model of vaccinator in the above patent requires 100 psi of air pressure in order for the needle to penetrate the egg shell without cracking the shell. After passing through the shell, the needle passes through the air cell at the same pressure, penetrates the allantoidal membrane, and continues until it reaches its course length, and vaccine is injected into the allantoidal liquid which is absorbed by the embryo.

Because of the high pressure with which the needle must break the shell, the above referenced process requires the use of different length needles, varying from 22 cm to 25 cm depending on the size of the egg, which is determined by the age of the laying flock. An egg from a flock of older parent birds will have an air cell larger than an egg from a younger parent bird and if a long needle is used to vaccinate an egg from a young flock there is a high probability that the embryo will be punctured by the needle causing injury or death. Even if the appropriate needle length for the flock age is used, it frequently happens that the embryo is positioned higher in the egg and is hit by the needle under high pressure, thereby causing death to the embryo. In addition to the monetary loss from embryo death, the need for various sized needles reduces the hatchery productivity.

The vaccinator referred to above injects vaccine through every injector regardless of whether or not an egg is in position below the injector. Hatching eggs can have up to 15% or more infertile eggs that will not hatch. A common practice is to remove the infertile eggs in a process called candling, a few days before transfer. The injection into the space without an egg is an expensive waste of vaccine.

The sanitization system of the vaccinator referred to above is one additional process which occurs after the vaccinator has injected a series of incubator trays. The rolling bridge moves the vaccination platform beyond the injection area and into the sanitization chamber where the injector platform and needles are sprayed with sanitation products. After sanitization has been completed, the injector platform is returned to the position over the next eggs to be injected.

The vaccinator referred to above is manufactured to inject only one size of incubator tray. Many hatcheries have more that one size tray, requiring that the hatchery have two or more in-egg vaccinators to vaccinate all of its eggs.

SUMMARY OF THE INVENTION

One of the objectives of the present invention is to provide constructive solutions for the problems mentioned above in an automatic in-egg vaccination so as to reduce the problems of the above mentioned platform, improve the sanitization of the vaccinator, improve the functioning of the injectors, eliminate the waste resulting from vaccine being injected into empty spaces where infertile eggs have been removed, improve the system of control and vaccine dosage and reduce embryonic deaths without compromising the productivity of the vaccination process.

During the vaccination process, the injector platform lowers the injectors, and aligns and secures them over the eggs. The new injector platform proposed herein preferably comprises a single plate made of high density plastic resistant to the effects of strong disinfectants, which is milled to the same configuration and size as the set of incubator trays to be transferred together. There are also spaces milled out longitudinally along the sides of the injectors for placement of bladders. There is only one vaccination cycle and after each injection, the needles and lower surface of the injectors are sanitized. The full size of the injection platform eliminates the need for multiple strokes to complete the injection of the incubator trays, making it a faster process and avoiding cross contamination that can occur when a needle injects more than one egg between sanitization cycles.

The injector of the present invention preferably has an external body made entirely of high density plastic resistant to corrosion from the strong disinfectants used in the sanitation process. This body has an inserted sleeve of plasticized fiber that is highly resistant to the effects of corrosive materials, is milled to precise tolerance to guarantee a tight seal with the plunger gasket, and is extremely smooth to insure the long life of the plunger that slides in its interior. The plunger, through whose center passes the injection needle, is attached to a two-stage spring for controlling the injection velocity and returning the plunger to its starting position. The plunger moves through an opening in the injector cap which is screwed onto the injector. An internal "0" ring in the cap helps to provide a seal to the self-contained pneumatic injector.

The two-stage spring, made of stainless steel, is one of the principal components of the improvements in the vaccinator of the present invention. By varying the spacing of the coils, the spring is composed of two stages working in series as two different springs. This two-stage spring permits the needle penetration of the egg shell at 100 psi for the first 18 mm of the stroke or course, which is the minimum depth of the membrane of the air cell. As the needle passes through the membrane the second stage of the spring that has a larger distance between the coils is reached and the pressure at the point of the needle is reduced to less than 5 psi. This reduction in pressure and velocity insures that if the needle does come into contact with the embryo, there is no harm to the embryo. In addition to protecting the embryo, only one-sized needle is needed to inject the eggs independent of the age of the laying flock.

An electronic sensor has been inserted into the injector cap to signal whether vaccine should be pumped into the needle for injection. It works by the sensor detecting contact with the injector platform. The platform is lowered down to the eggs and when an injector makes contact with an egg, the injector cap will be pushed away from the platform. If there is no egg in a particular position, the cap will continue to maintain contact with the platform. The sensor imbedded in the injector cap sends a signal to the PLC (programmable logic controller) indicating whether there is an egg in position and whether or not the needle should receive vaccine. The injectors that remain with their caps resting on the platform do not receive vaccine.

An important part of the present vaccinator is an electronically controlled pinch valve positioned on the vaccine tubing of each individual needle that controls the flow of vaccine through the vaccine line to the needle. The utilization of this high speed pinch valve guarantees an exact dosage to each needle by the amount of time it is left open and also blocks the flow of vaccine to the injectors that are not resting on eggs as signaled by the electronic sensor located in the injector cap, thereby saving vaccine.

Another innovation in the present vaccinator is the closed system of vaccine delivery, without contact with the ambient air that employs a precise electronic micro pressure controller to guarantee the correct dosage of vaccine passing through each pinch valve.

The key to controlling the exact vaccine dosage to each needle is in maintaining an exact and uniform pressure without oscillations throughout the system. An electronic pressure sensor measures the pressure on the vaccine delivery manifold at the point most distant from the vaccine bag chamber and monitors it with a precision micro processed micro pressure controller.

At the start of the vaccination process the pressure in the system is stable because all the pinch valves are closed. The moment the pinch valves open and vaccine begins to flow to the needles, the pressure automatically drops. The electronic sensor on the manifold immediately senses the pressure drop and sends the information to the micro processed pressure controller that then restores the pressure to its original value. When the vaccination process has been completed and the pinch valves close, an increase in pressure is immediately sensed and the micro processed pressure controller reacts instantly by reducing the air pressure to its normal value.

The vaccinator is automatic and controlled by a PLC (Programmable Logic Controller) that monitors all parameters including time, pressure and sequence of processes. The dosage is controlled automatically by the PLC. A load cell mounted with the vaccine chamber monitors the exact weight of the vaccine at all times. After each vaccination cycle, the PLC verifies how many injectors actually injected vaccine into the eggs and through reading the load cell weights before and after the cycle, calculates how much vaccine was delivered. If the quantity delivered varies from the desired quantity, the PLC will compensate for this difference by altering the time the pinch valves remain open.

To guarantee confidence in the process, if corrections are made on three consecutive injections, the PLC will set off an alarm and deactivate the vaccinator, advising that there is a problem in the vaccine delivery system that must be attended to.

Another objective of this invention is a sanitation system that sanitizes the needles and injectors after each injection of eggs to maximize the higenization of the vaccinator. If the needles and injectors are not thoroughly sanitized after each contact with the eggs, there is an increased chance of cross contamination which can result in embryonic death. The sanitizing sprays are attached to the mechanism that moves the trays from the injection area to the transfer area. As the tray begins to move, the needles are lowered from the injectors and the spray mechanism showers the needles and injectors with a pulverizing spray of disinfectant that rapidly eliminates microorganisms. The combination of spraying the needles and injectors while the tray is being moved out of the injection area saves time.

BRIEF DESCRIPTION OF THE DRAWINGS

FIG. 3 illustrates the parts and position of the needle and injector sanitization system;

FIG. 4 illustrates a cross section of the injector platform that shows the position of the air bladders;

FIG. 5 illustrates a side view of the air cylinder mechanism that removes the incubator tray after the vaccination process;

FIG. 6 illustrates the in-egg vaccinator in full prospective view with its component parts;

DETAILED DESCRIPTION OF THE INVENTION

In accordance with the illustrations above, a tray of fertile eggs is manually introduced into the vaccinator. The movement of the incubator tray through the vaccination process is controlled by three presence sensors. The first sensor detects the incubator tray entering the vaccinator and activates the tray-stop that halts the incubator tray in the correct position below the injection platform.

In this position, the second sensor is activated and a lateral brake is applied to the incubator tray to hold it in position, and the above referred tray-stop is released. The second sensor also activates the injection platform 18, shown in FIG. 2, to lower it over the eggs. A third sensor blocks the action of the first sensor until the tray leaves the vaccination area.

Figure 7:
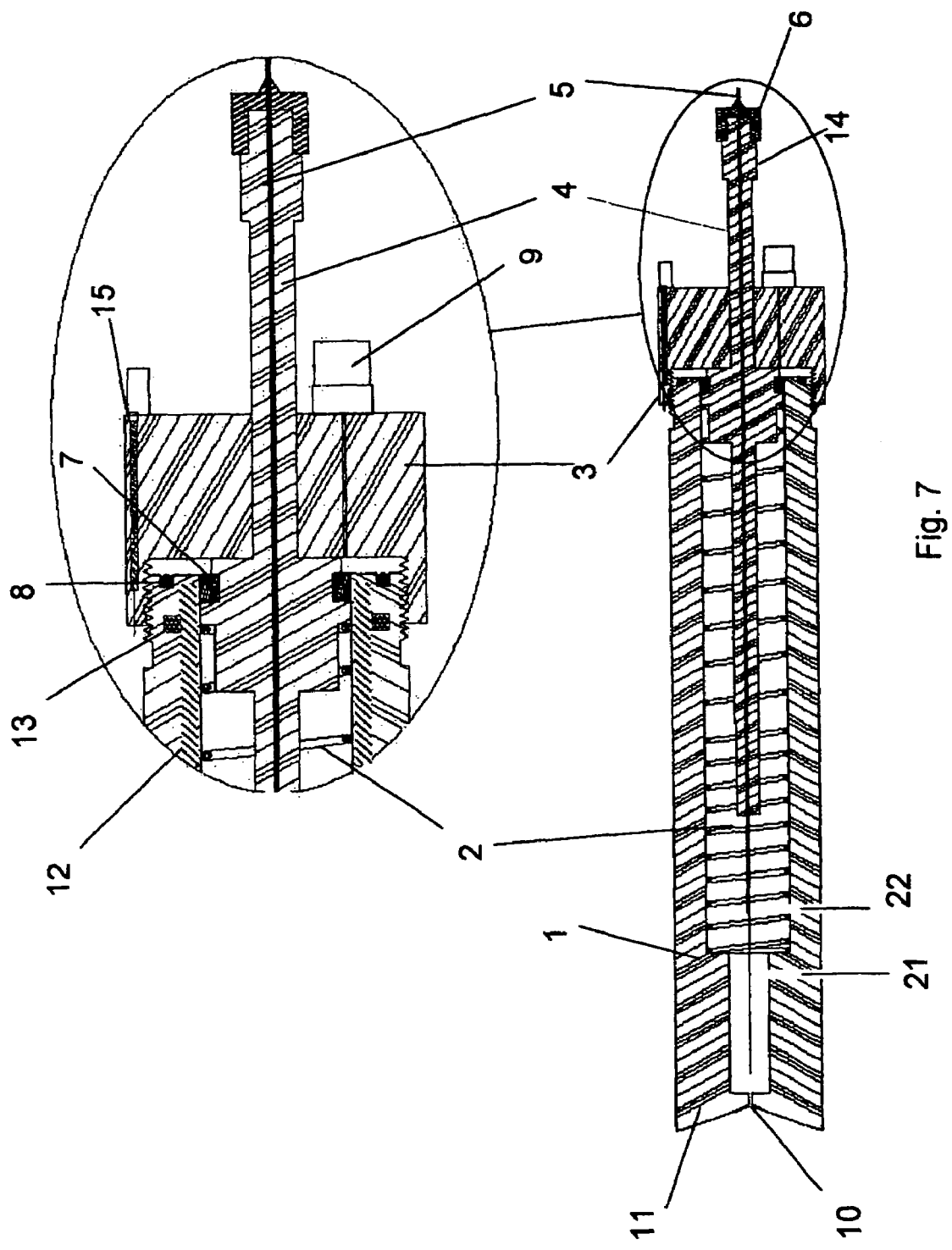
FIG. 7 illustrates a cross section of the injector mechanism where the internal components can be seen.
Figure 8:
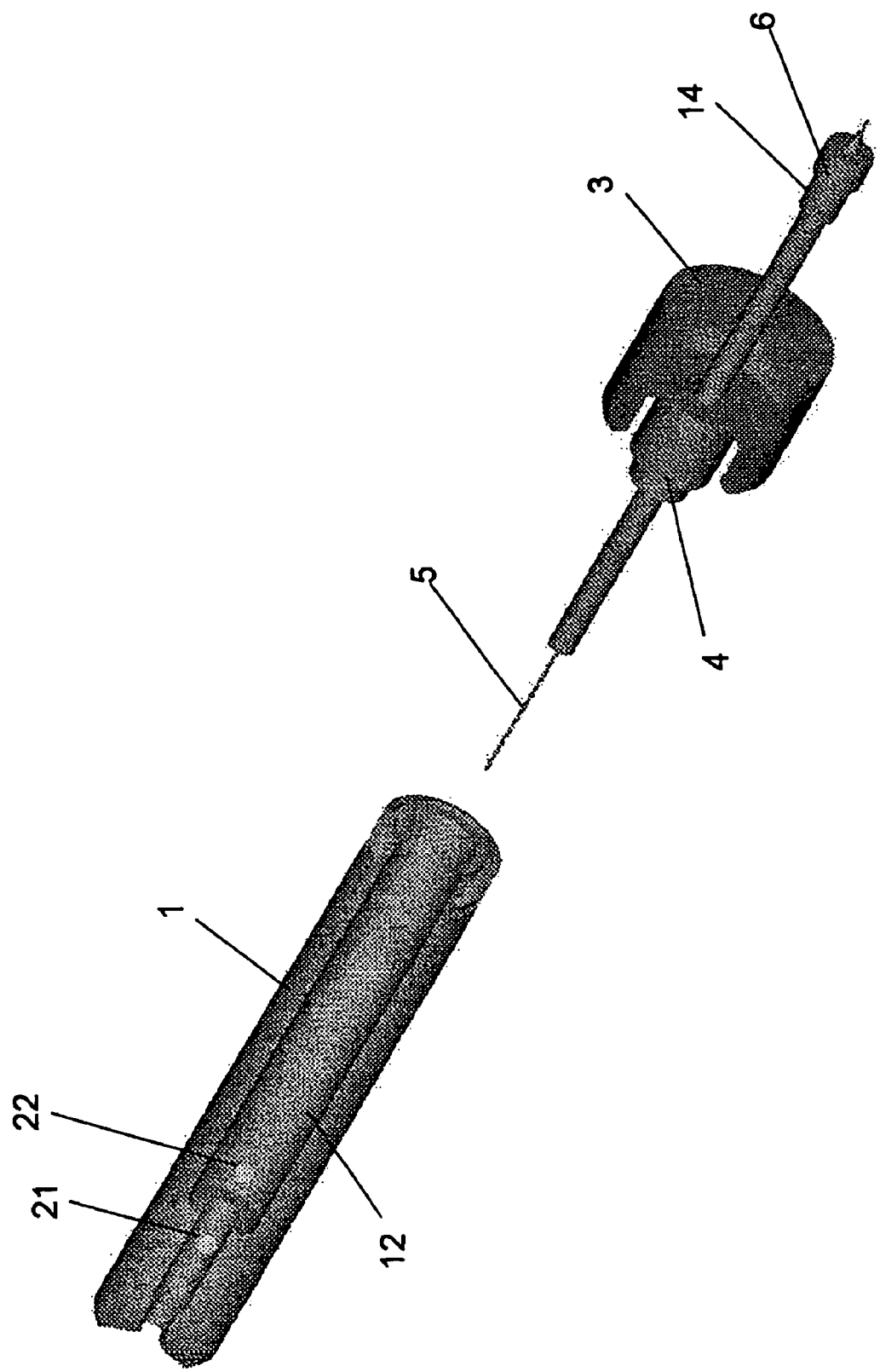
FIG. 8 illustrates a three dimensional enlargement of a cross section of the injection mechanism.

As injection platform 18 is lowered, the injectors are preferably positioned on top of the eggs. As seen in FIG. 7, the injectors are composed of a cylindrical body 1, and a cap 3 with an electronic contact sensor 15, which form a pneumatic cylinder, with an internal plasticized fiber sleeve 12, with a precisely milled interior, where a pneumatic plunger 4 is inserted, through whose center passes the injection needle 5, and which rests on a two-stage return spring 2.

The two-stage spring 2, preferably made of stainless steel, preferably has at least two sections with different coil spacing and/or spring rate. By varying the spacing or spring rate of the coils, the spring is essentially composed of two stages working in series as two different springs. This two-stage spring permits the needle penetration of the egg shell at 100 psi for the first 18 mm of the stroke or course, which is the minimum depth of the membrane of the air cell. As the needle passes through the membrane the second stage of the spring that has a larger distance between the coils is reached and the pressure at the point of the needle is reduced to less than 5 psi. This reduction in pressure and velocity insures that if the needle does come into contact with the embryo, there is no harm to the embryo. In addition to protecting the embryo, only one-sized needle is needed to inject the eggs independent of the age of the laying flock.

As shown in FIG. 7, the injector system preferably has three seals, one O-ring gasket 7 between plunger 4 and plasticized fiber sleeve 12, which is a specially designed rubberized gasket, a rubberized O-ring 8 that seals the air cylinder between cap 3 and injection body 1, and another O-ring 13 that seals the area between the upper end of plasticized fiber sleeve 12 and the interior of the injector body 1.

Figure 2:
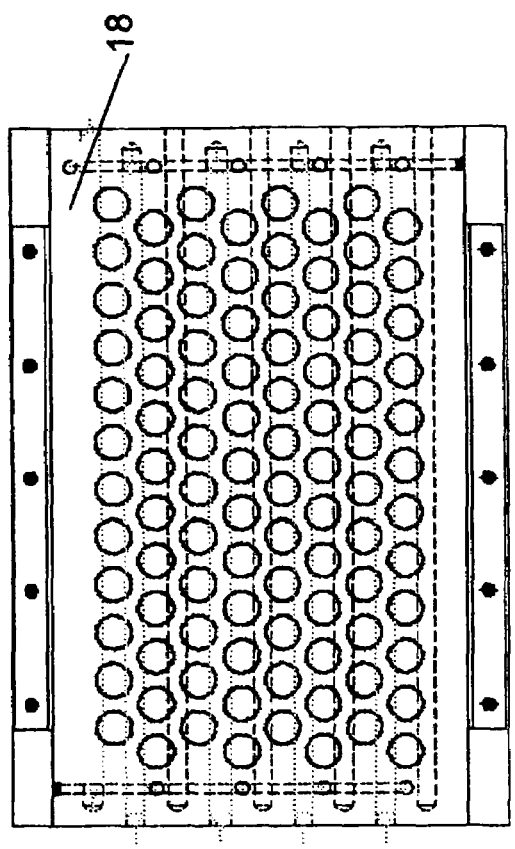
FIG. 2 illustrates a view from above that shows the configuration of the injector platform.
Figure 1:
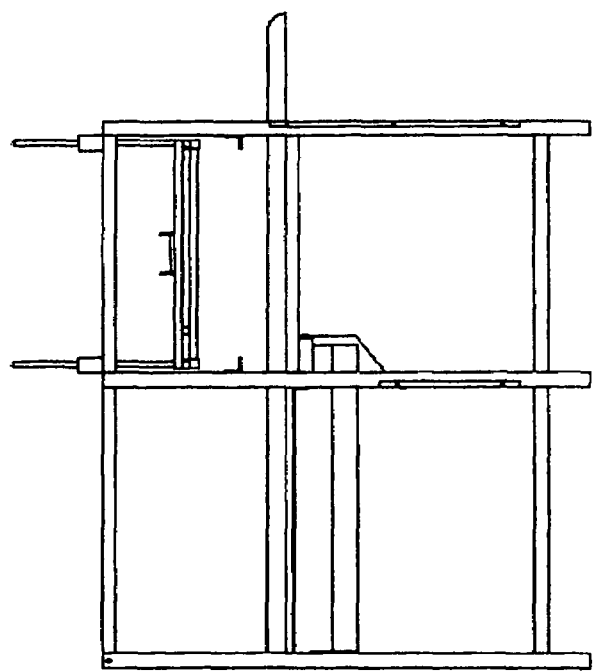
FIG. 1 is a front view of the structure of the in-egg vaccinator on which the injector platform and other components are mounted.

The injector platform 18, as shown in FIG. 2, is made with injector guide holes that are conical. The diameter of the openings on the superior side of the platform is slightly larger than the injectors to allow free passage, while the inferior side of the platform has larger diameter holes. This allows slight lateral movement of the injector as it is lowered relative to the platform. As the conical base 10 of the injector, shown in FIG. 7, rests on an egg, the injector is able to tilt to the inclination angle of the egg, assuring a proper alignment for needle penetration which should be centralized at the most elevated point.

The exit hole 11, shown in FIG. 7, milled into the concave end 10 of the injector, serves as the injection needle guide. With injector resting at the correct orientation for injection, the air bladders 16, shown in FIG. 4, in the interior of platform 18, which are positioned on the outsides and between the rows of injectors, are inflated and pressed against the injector bodies 1 with sufficient force to hold the injectors firmly in place, i.e., with no further movement. At this moment, the needles 5 perforate the egg shells.

Plunger 4 activated by compressed air injected through the pneumatic entrance 9 is atravessado by the needle 5 that has solid movement to the plunger attachment 14 by means of a screw connection to the top 6.

Electronic sensor 15 has been inserted into injector cap 3 to signal whether vaccine should be pumped into needle 5 for injection. It works by the sensor detecting contact with injector platform 18. The platform 18 is lowered down to the eggs and when an injector makes contact with an egg, the injector cap 3 will be pushed away from the platform 18. If there is no egg in a particular position, the cap 3 will continue to maintain contact with the platform 18. The sensor 15 imbedded in the injector cap 3 sends a signal to the PLC (programmable logic controller) indicating whether there is an egg in position and whether or not the needle should receive vaccine. The injectors that remain with their caps 3 resting on the platform 18 do not receive vaccine.

An important part of the present vaccinator is an electronically controlled pinch valve 17 positioned on the vaccine tubing of each individual needle 5 that controls the flow of vaccine through the vaccine line to the needle 5. The utilization of this high speed pinch valve 17 guarantees an exact dosage to each needle 5 by the amount of time it is left open and also blocks the flow of vaccine to the injectors that are not resting on eggs as signaled by the electronic sensor 15 located in the injector cap 3, thereby saving vaccine.

The pinch valves 17 open and the vaccine is forced into the eggs. The pinch valves 17 then close. The needles 5 are then withdrawn from the eggs, into the injectors and platform 18 rises to its highest point. Then, the needles 5 are once more forced out of the injectors.

The pneumatic expulsor 19 then begins to push the tray out of the vaccination area and simultaneously the sanitizing nozzles 20 spray sanitizing liquid over the needles 5 and injectors. When the tray is beyond the vaccination area, the nozzles cease spraying and the expulsor 19 returns to its initial position.

One aspect of the present invention is characterized by a closed system vaccine system that helps guarantee an uncontaminated vaccine delivery and an accurate dosage for each egg. The vaccine is delivered in the closed system by air pressure. The pressure on the vaccine is measured electronically at the point in the distribution manifold furthest from the vaccine bag chamber and fluctuations are compensated immediately by the electronic pressure control valve.

The system is characterized by a closed system vaccine delivery system that helps guarantee the vaccine will not be contaminated between the sterilized vaccine bag delivered by the vaccine manufacturer, the silicone vaccine lines that feed the manifold, the manifold, and the silicone vaccine lines that serve the needles.

The system is characterized by a load cell located beneath the vaccine bag chamber that weighs the chamber after each vaccination and compares the number of eggs vaccinated to the quantity of vaccine injected to ascertain if the correct dosage was applied. If the dosage varies from the programmed quantity, the PLC automatically recalculates the correct opening and closing times of the pinch valves and if the need for correction is repetitive the PLC will stop the vaccination process until the problem can be resolved.

What is claimed is:

1. An injection apparatus for eggs, comprising:
    an injector platform associated with at least one injector, capable of injecting eggs on an incubator tray; and
    an electronic contact sensor operable to detect contact between said injector and said platform, as a means of signaling if an egg is located below said injector.

2. The apparatus of claim 1, wherein said platform comprises at least one feature taken from the group consisting of:
    said platform is made from high density plastic;
    said platform is adapted to inject an entire set of incubator trays at one time;
    and said platform is adapted to be interchangeable with other injector platforms for other sized incubator trays through a quick connect system.

3. The apparatus of claim 1, wherein said platform is associated with a system of elongated air bladders positioned longitudinally in the interior of said platform, between rows of injectors, wherein said air bladders, when inflated with compressed air, help to secure the injectors firmly into their individual positions, at a predetermined angle of inclination, and can help to absorb vibrations and impacts caused by the process of injecting vaccine into the eggs, wherein said bladders are made of highly resistant synthetic material capable of withstanding high air pressure.

4. The apparatus of claim 1, wherein said sensor is located on a cap, and said apparatus is adapted so that when said injector platform is lowered over an incubator tray, and said injector is nested on an egg, said cap is moved away from said platform, causing said platform to lose physical contact with said sensor, wherein said sensor is adapted to send a signal that an egg is present and vaccination should take place.

5. The apparatus of claim 1, wherein a flow control valve is provided on a tubing through which a vaccine can be delivered to said needle, wherein said valve helps to control the correct dosage applied to each individual egg, and to not vaccinate spaces in the incubator tray that do not contain eggs.

6. The apparatus of claim 5, wherein said flow control valve's activation is monitored and registered by a controller as an egg is vaccinated.

7. The apparatus of claim 1, further comprising a flow control valve in communication with said sensor wherein said flow control valve opens to allow vaccine to flow to said injector in response to a signal from said sensor indicating that an egg is located below said injector.

8. The apparatus of claim 1, further comprising:
    a needle connected to said injector; and
    a spring biasing said needle, wherein said spring comprises a first and second stage, and wherein a first force constant associated with said first stage is different from a second force constant associated with said second stage.

9. The apparatus of claim 8, wherein said first stage comprises a first spring coil spacing and said second stage comprises a second spring coil spacing different from said first spring coil spacing.

10. The apparatus of claim 8, wherein said first stage is operable to allow said needle to penetrate an egg shell at a pressure of up to 100 psi.

11. The apparatus of claim 10, wherein said second stage is operable to allow said needle to penetrate an air cell within the egg and arrive at an allantoidal membrane within the egg at a pressure of less than 5 psi.

* * * * *